Oct. 2, 1973 C. F. SCHOEPFLIN Re. 27,767

FLUID LEVEL GAUGE ASSEMBLY

Original Filed Dec. 28, 1970

INVENTOR.
CHARLES F. SCHOEPFLIN
By His Attorneys
HARRIS, KIECH, RUSSELL & KERN

United States Patent Office

Re. 27,767
Reissued Oct. 2, 1973

27,767

FLUID LEVEL GAUGE ASSEMBLY

Charles F. Schoepflin, 8244 Crenshaw Drive, Inglewood, Calif. 90305

Original No. 3,638,493, dated Feb. 1, 1972, Ser. No. 101,450, Dec. 28, 1970. Application for reissue Apr. 19, 1972, Ser. No. 245,666
Int. Cl. G01f *23/12*
U.S. Cl. 73—318 4 Claims

Matter enclosed in heavy brackets [ ] appears in the original patent but forms no part of this reissue specification; matter printed in italics indicates the additions made by reissue.

ABSTRACT OF THE DISCLOSURE

An easy to construct and install gauge assembly for continuously monitoring the level of fluid in a tank in response to movement of a float secured to a lower shaft of the assembly. The assembly comprises a gauge on a support body over a small opening in the top of the tank and responsive to turning of an upper shaft within the support body. Upper and lower brackets connected by a support arm extend from the body within the tank. The upper bracket is releasably secured in a vertical bore in the body adjacent the gauge. The upper and lower brackets include a pair of upper and lower open-ended slots, respectively, for receiving the upper and lower shafts and sprockets for supporting a continuous loop of chain. The pairs of upper and lower slots and hence the upper and lower shafts are angularly displaced at an angle greater than 90° and less than 180° whereby the chain is twisted to remove undesired slack and such that vertically extending portions of the chain are spaced from the support arm from each other.

The present invention relates to an improved gauge assembly for monitoring the level of fluid in a tank.

Commercially available assemblies for monitoring the level of a fluid in a tank commonly comprise pairs of drive and driven gears and an elongated shaft. The gears and shaft are precision formed and are mounted in special bearing configurations to mechanically turn a dial of an associated gauge in response to movement of a float connected to one of the gears. Because the gears are precision formed, they are relatively expensive. The same is often true of the bearing configurations which, in addition, require periodic servicing and replacement.

In view of the foregoing, it is an object of the present invention to provide a simplified, relatively inexpensive and easy to construct and install gauge assembly for monitoring the level of fluid in a tank.

Another object of the present invention is to provide a fluid gauge assembly of the foregoing character which does not require or incorporate gears or special bearing mounts.

A further object of the present invention is to provide an improved gauge assembly of the foregoing character including upper and lower shafts resting and guided in open-ended upper and lower slots of upper and lower brackets, respectively.

Still another object of the present invention is to provide a gauge assembly of the foregoing character further including sprockets on the shafts supporting a continuous loop of chain which drives the upper shaft to turn a gauge dial in response to turning of the lower shaft with movement of a float within the tank.

A still further object of the present invention is to provide a gauge assembly of the foregoing character wherein the upper and lower shafts are angularly displaced to produce a partial twisting of the chain such that all undesired slack is removed from the chain and such that vertically extending portions of the chain do not engage supporting structure or each other.

Other objects and advantages of the present invention may be more clearly understood by reference to the following detailed description when considered with the drawing which, by way of example only, illustrates one form of a gauge assembly embodying the features of the present invention.

Figure 1:
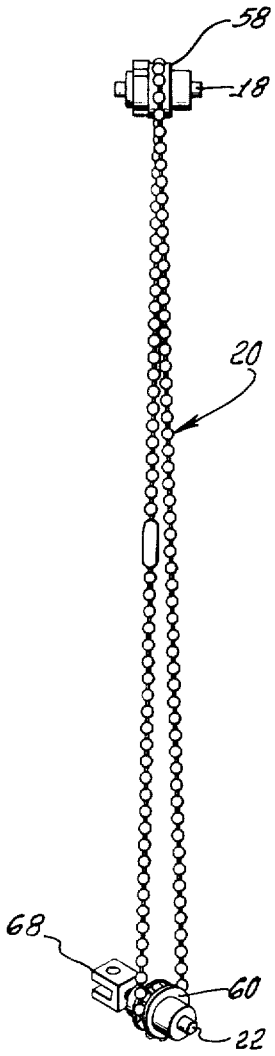
FIG. 1 is a perspective view of the drive chain and supporting sprockets and shafts included in the illustrated form of the gauge assembly of the present invention.
Figure 2:
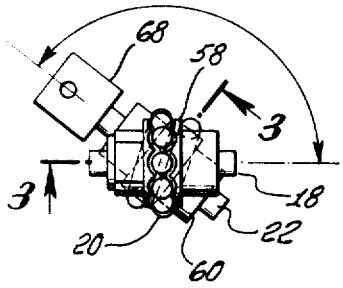
FIG. 2 is a top view of the drive chain and supporting sprockets and shafts illustrated in FIG. 1.
Figure 3:
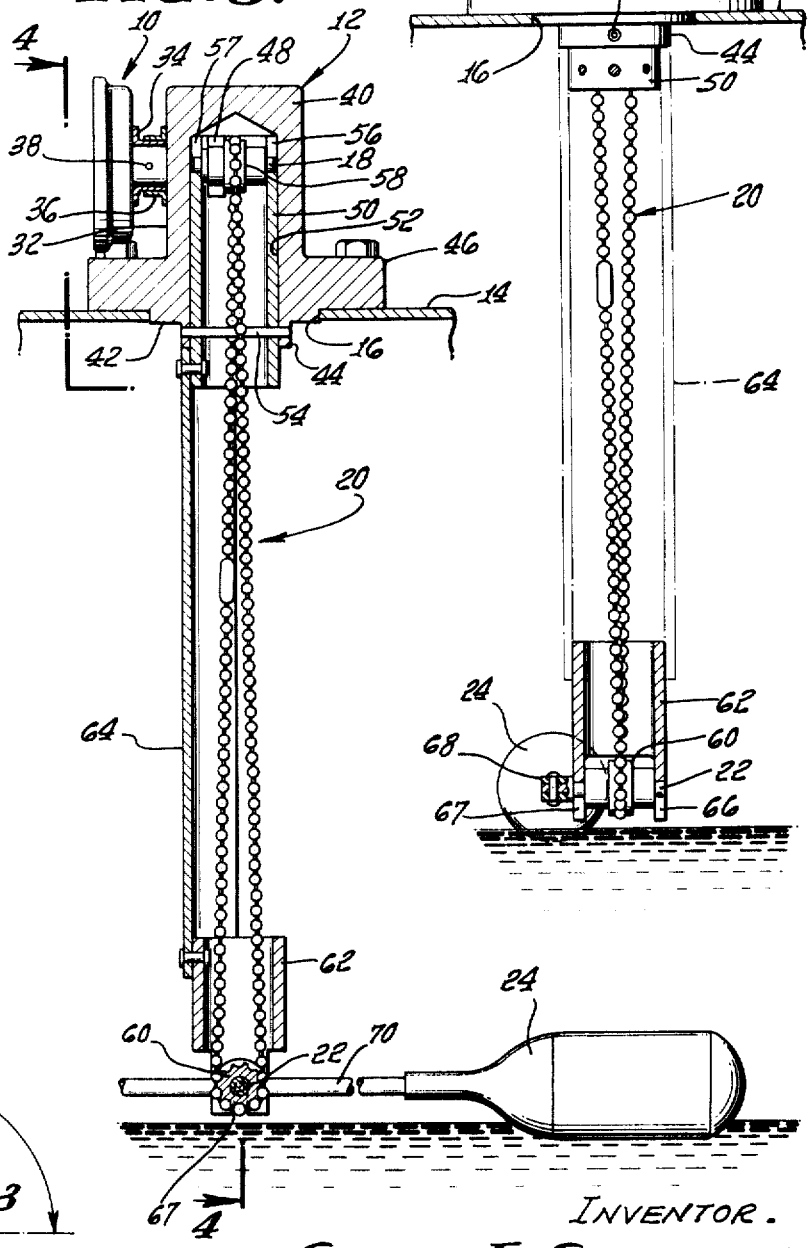
FIG. 3 is a sectional side view of the gauge assembly taken along the line 3—3 in FIG. 2.
Figure 4:
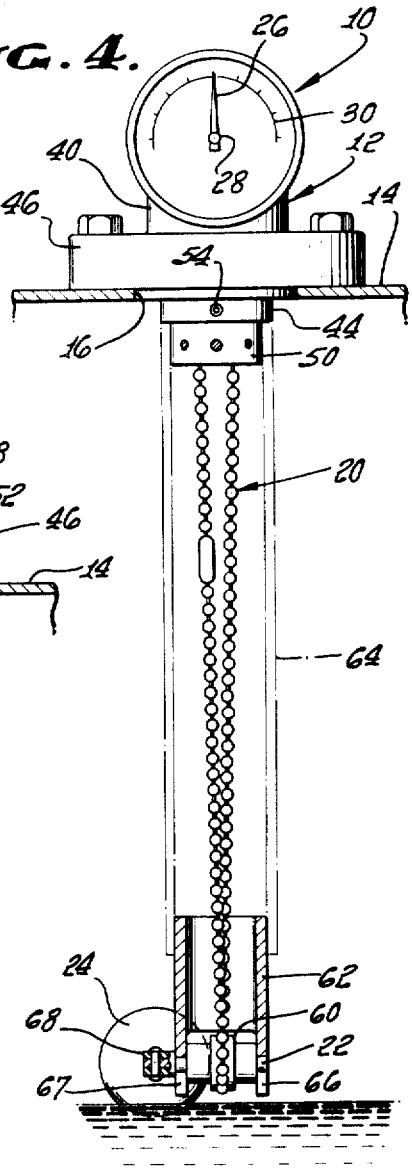
FIG. 4 is a sectional front view of the gauge assembly taken along the lines of 4—4 in FIG. 3.

Generally speaking, the assembly comprises a gauge 10 secured to the outside of a support body 12 mounted on top of a tank 14 over a relatively small opening 16. The gauge 10 is responsive to a turning of an upper shaft 18 within the support body 12. The shaft 18 is turned by driving movement of a chain 20 in a response to a turning of a lower shaft 22 connected to a float 24. The float 24 rides on the top of a fluid within the tank 14 such that the float rises and falls with changes in the level of the fluid to produce a corresponding turning of the lower and upper shafts and hence a continuous indication on the gauge of the level of the fluid.

More specifically, the gauge 10 may be of a conventional magnet driven type including a dial 26 mounted on a shaft 28 to which is secured a magnet (not shown). The dial 26 is adapted to turn with the shaft 28 in front of a scale 30 divided into units of volume to indicate the quantity of fluid within the tank 14. The gauge 10 is secured to an upwardly extending face 32 of the support body 12 by means of tubular mating bosses 34 and 36 extending from the back of the gauge 10 and the face 32 respectively and by means of a spring pin 38 passing through aligned openings in the mating bosses. In this manner, the gauge 10 may be simply removed from the supporting body 12 by removing the pin 38 and slipping the boss 34 from within the boss 36.

The support body 12 includes an upwardly extending portion 40 having a stepped lower face 42 for tightly fitting within the opening 16 with a neck 44 extending downwardly therethrough and into the tank 14. Flanges 46 extend outwardly from the vertical portion 40 and are secured to the top of the tank 14 as by bolts or screws.

As previously indicated, the gauge 10 is responsive to a turning of the shaft 18. In the illustrated form of the present invention, the shaft 18 is mounted within the support body 12 in line with the shaft 28 and carries a magnet 48 for turning the shaft 28 in response to a turning of the shaft 18. The mounting arrangement for the shaft 18 is quite simple, as is the entire assembly. In this respect, the shaft 18 is supported by an upper tubular bracket 50. The tubular bracket 50 fits within a vertical bore 52 in the support body 12 extending upwardly through the neck 44. The upper bracket 50 is dimensioned to extend below the neck 44 and into the tank 14. It is secured in place within the bore 52 by means of a spring pin 54 extending through aligned openings in the neck 44 and in the upper bracket 50. In this way, the upper bracket is easily mounted within the bore 52 simply by inserting the bracket upwardly into the bore and slipping the spring pin 54 into place.

To support the upper shaft 18, the upper bracket 50 includes a pair of diametrically opposite vertically extending and open-ended upper slots 56 and 57. The shaft 18 is mounted in the bracket 50 simply by slipping the shaft 18 over the top of the bracket and allowing it to drop down inwardly within the slots 56 and 57 with opposite ends of the shaft resting on the lower ends of the slot.

Thus mounted, the shaft 18 supports a sprocket 58 for turning with the shaft and supporting the chain 20. An opposite end of the chain 20 extends around a similar sprocket 60 secured on the lower shaft 22 which, in turn, is guided by a lower bracket 62.

The lower bracket 62 is secured to the upper bracket 50 within the tank 14 but by means of a vertical support arm 64. Preferably, the support arm 64 takes the form of a half-tube secured as by rivets, welding, or the like, to the lower portion of the upper bracket 50 extending below the neck 44 and to an upper portion of the lower bracket 62. The concave portion of the half-tube faces the chain 20.

The lower bracket 62 resembles the upper bracket 50 in that it is tubular in shape for receiving the chain 20 and includes a pair of vertically extending diametrically opposite and open-ended lower slots 66 and 67. It bears noting that the lower slots 66 and 67 do not provide vertical bearing support for the lower shaft 22 or the sprocket 60 but rather function only as lateral guides for the shaft 22. The lower shaft 22 and sprocket 60 are, in fact, supported by the chain 20 as it extends from the upper sprocket 58.

As previously indicated, the float 24 is connected to the lower shaft 22 to produce a rotation thereof in response to changes in the level of the fluid within the tank 14. In this regard, one end of the shaft 22 extends outwardly beyond the side of the lower bracket 22 to receive a U-shaped yoke 68. A float rod 70 passes through the yoke and is secured in place as by a rivet. The float 24 is connected to one end of the rod 70 while a counter-balancing weight (not shown) is connected to an opposite end of the rod.

It bears noting that the upper and lower shafts 20 and 22 are angularly displaced from each other and that by virtue of such displacement, the chain 20 is twisted. The twisting of the chain is quite important in the gauge assembly of the present invention. First, the twisting insures that all unnecessary slack is taken from the chain during assembly of the gauge. Secondly, the twisting spaces vertically extending portions of the chain from the support arm 64 and insures that they will not contact the support arm during operation of the gauge. It is important in this regard that the vertically extending portions of the chain do not rub against each other during operation of the gauge. In this respect, the upper and lower shafts 20 and 22 lie in vertical planes which are angularly displaced from each other by more than 90° but less than 180° and preferably between 170° and 175°. To produce such angular displacement of the upper and lower shafts 20 and 22, the pairs of upper and lower slots 56, 57 and 66, 67 are angularly displaced from each other. The upper and lower shafts being supported within the upper and lower pairs of slots are likewise angularly displaced to produce the desired twisting of the chain 20.

As previously indicated, the design of the present invention produces a gauge assembly which is easy to construct and to install. In this regard, to construct the gauge assembly, the support arm 64 is secured to the upper bracket 50. The chain 20 is then trained over the upper sprocket 58 and upper shaft 18 and dropped through the upper bracket until the ends of the shaft 18 rest on the bottoms of the slots 56 and 57. The lower portion of the chain is then dropped through the lower bracket 62 which is not yet attached to the support arm 64. The lower portion of the chain is trained around the lower sprocket 60 and shaft 22, and the lower bracket 22 is slipped downwardly such that the ends of the shaft 22 enter the open ends of the slots 66 and 67 to provide lateral guidance for the shaft 22. The lower bracket 62 is then turned relative to the upper bracket 50 until the lower shaft 22 and upper shaft 20 are angularly displaced between 90° and 180° and preferably between 170° and 175°. The lower bracket 62 is then secured to the support arm 64.

Next, the upper bracket is mounted within the support body 12 by slipping the upper bracket upward into the vertical bore 52 and by inserting the spring pin 54 into the aligned openings. The rod 70 is then secured to the yoke 68 with the float 24 attached to one end thereof.

The gauge assembly is now ready for installing within the tank 14. To accomplish this, the rod 70 is brought into vertical alignment with the support arm 64 and the support arm and rod are introduced through the opening 16 into the tank. Flanges 46 of the support body 12 are then secured to the top of the tank to complete the installation.

Once the assembly is installed, any changes in the fluid level within the tank 14 will produce a rise and fall of the float 24. This, in turn, will produce a turning of the lower shaft 22 and lower sprocket 60. The chain 20 produces a like turning of the upper shaft 22 and upper sprocket 53 to produce a turning of the magnet 48. The turning of the magnet 48 produces a like turning of the magnet on the shaft 28 to cause the dial 26 to move along the scale 30 and continuously indicate the level of the fluid within the tank.

While a particular form of gauge assembly has been described in detail herein, changes and modifications may be made therein without departing from the spirit of the invention. Accordingly, the present invention is to be limited in scope only by the terms of the following claims.

I claim:

1. An easy-to-construct-and-install gauge assembly for mounting on a tank to monitor the level of fluid contained therein, comprising:

a gauge supporting body for mounting on an exterior of a fluid containing tank over a small opening in a top of said tank, said body including a lower neck portion for extending through said opening into said tank and having a substantially vertical bore extending through said neck into said body above said top of said tank;

an upper bracket for mounting in said bore with a lower end extending below said neck in said tank, said upper bracket including diametrically opposite substantially vertical upper slots open to a top of said upper bracket for vertically receiving a shaft from a top of said upper bracket prior to insertion of said upper bracket into said bore;

means for securing said upper bracket in said bore;

an upper shaft having opposite ends for resting on bottoms of said upper slots whereby said upper shaft is free to turn on its longitudinal axis relative to said upper bracket;

an upper sprocket mounted on said upper shaft for turning therewith;

an elongated substantially vertical support arm secured to said lower end of said upper bracket for extending downward into said tank;

a lower bracket secured to a lower end of said support arm and including diametrically opposite substantially vertical lower slots open to a bottom of said lower bracket for vertically receiving a shaft from a bottom of said lower bracket, said lower slots lying in a vertical plane angularly displaced at an angle greater than 90° and less than 180° from a vertical plane including said upper slots;

a lower shaft having opposite ends for riding in said lower slots, one of said ends extending outwardly beyond said lower bracket;

a lower sprocket mounted on said lower shaft for turning therewith;

a float carrying rod secured to said one end of said lower shaft for turning said lower shaft with changes in the level of fluid in said tank;

a loop of chain extending around and between said upper and lower sprockets for turning said upper sprocket and shaft in response to turning of said lower sprocket and shaft, said chain being twisted by virtue of the angular displacement of said upper and lower shafts in said upper and lower slots whereby vertical extending portions of said chain are spaced from said support arm and each other; and a gauge mounted on said support body and responsive to a turning of said upper shaft to continuously indicate the level of fluid in said tank.

2. The gauge assembly of claim 1 wherein said bore in said support body is substantially cylindrical, said upper and lower brackets are tubular, said support arm comprises a section of a vertically extending tube having a curved inner surface facing said chain and wherein said means for securing said upper bracket in said bore comprises a pin for passing through aligned openings in said neck and upper bracket to releasably secure upper bracket in said bore.

3. The gauge assembly of claim 2 wherein said lower slots are angularly displaced from said upper slots at an angle between 170 and 175°.

*4. An easy to construct and install gauge assembly for mounting on a tank to monitor the level of fluid contained therein, comprising:*

*a gauge supporting body for mounting on an exterior of a fluid containing tank over a small opening in a top of said tank, said body including a lower neck portion for extending through said opening into said tank and having a substantially vertical bore extending through said neck into said body above said top of said tank;*

*an upper bracket for mounting in said bore with a lower end extending below said neck in said tank, said upper bracket including diametrically opposite substantially vertical upper slots open to a top of said upper bracket for vertically receiving a shaft from a top of said upper bracket prior to insertion of said upper bracket into said bore;*

*means for securing said upper bracket in said bore;*

*an upper shaft having opposite ends for resting on bottoms of said upper slots whereby said upper shaft is free to turn on its longitudinal axis relative to said upper bracket;*

*an upper sprocket mounted on said upper shaft for turning therewith;*

*an elongated substantially vertical support arm secured to said lower end of said upper bracket for extending downward into said tank;*

*a lower bracket secured to a lower end of said support arm and including diametrically opposite substantially vertical lower slots open to a bottom of said lower bracket for vertically receiving a shaft from a bottom of said lower bracket;*

*a lower shaft having opposite ends for riding in said lower slots, one of said ends extending outwardly beyond said lower bracket;*

*a lower sprocket mounted on said lower shaft for turning therewith;*

*a float carrying rod secured to said one end of said lower shaft for turning said lower shaft with changes in the level of fluid in said tank;*

*a loop of chain extending around and between said upper and lower sprockets for turning said upper sprocket and shaft in response to turning of said lower sprocket and shaft; and*

*a gauge mounted on said support body and responsive to a turning of said upper shaft to continuously indicate the level of fluid in said tank.*

References Cited

The following references, cited by the Examiner, are of record in the patented file of this patent or the original patent.

UNITED STATES PATENTS

| | | | |
|---|---|---|---|
| 13,519 | 9/1855 | Boyd | 73—321 |
| 1,314,983 | 9/1919 | Savage | 73—321 |
| 1,375,131 | 4/1921 | Cox | 73—318 |
| 83,108 | 10/1868 | Thomas | 73—321 |
| 1,397,267 | 11/1921 | Cox | 73—318 |

RICHARD C. QUEISSER, Primary Examiner

D. M. YASICH, Assistant Examiner

U.S. Cl. X.R.

73—321